UNITED STATES PATENT OFFICE.

PAUL CHRISTEN JENSEN, OF CHICAGO, ILLINOIS.

FERTILIZER.

SPECIFICATION forming part of Letters Patent No. 378,688, dated February 28, 1888.

Application filed December 6, 1886. Renewed February 2, 1888. Serial No. 262,806. (No specimens.)

*To all whom it may concern:*

Be it known that I, PAUL CHRISTEN JENSEN, of the city of Chicago, county of Cook, and State of Illinois, have invented a new and useful Improvement in Fertilizers, of which the following is a full and complete specification and description.

My invention relates to the manufacture of fertilizers from nitrogenous organic matter, such as is obtained from the slaughter of horned cattle, hogs, and the like, and particularly from tank-water, which is a product obtained in the process of rendering fats.

The object of my invention is to provide a fertilizer which shall have these nitrogenous products in its composition, and which shall at the same time be of such a character as not to lose its dry or powdery form when brought in contact with moisture, and which shall retain a large proportion of original organic constituents.

It is found, in the products which result from the process of rendering fats of horned cattle, hogs, and the like, that when such fatty matter is subjected, in tanks or other suitable vessels, to the action of steam, the product is separated into three layers or formations in the rendering-tank. The upper layer contains the fats and oils. The middle layer contains a product known as "tank-water," and the lower layer contains a product composed of meaty fiber, known as "tankage." This tank-water is rich in nitrogenous organic matter, and from this tank-water it has been unsuccessfully attempted to make a rich ammoniate fertilizer, the failure resulting from its deliquescent properties. It is evaporated and boiled down until it takes the form of a dark, sticky, gummy substance, which, upon being dried and cooled, becomes hard and brittle. It may then be pulverized, and becomes an exceedingly rich fertilizer, which may be used in the form of a powder. In like manner the tankage or the meaty fiber in the lower layer of the rendering-tank possesses rich fertilizing properties, and it can be similarly treated, either separately or combined with the tank-water residue, so as to form a rich fertilizer. It is also rich in nitrogenous organic matter. The blood of horned cattle, hogs, and the like is rich in combined organic nitrogen, and when in a suitable condition, after having been evaporated and dried, it can be used as a fertilizer; and there are many other substances or products derived from animals in the usual process of slaughtering which, like the foregoing, are rich in nitrogenous organic matter, and can be used, either separately or in combination with one another or in combination with some or all of the foregoing, to form fertilizers. The objections to these several products as fertilizers, and the difficulty with which their use is attended, consist in the fact that all have a strong tendency to deliquescence, and this is particularly true of the tank-water, because it contains large quantities of gelatine, chondrine, and the more deliquescent albuminoids. Thus these substances, after being properly evaporated, dried, and pulverized, when exposed to atmospheric air, immediately begin to absorb moisture from the atmosphere, and soon become gummy, sticky, and liquefied, in which condition they are not fit for use either as fertilizers independently or to be combined with other fertilizers, and neither can they be packed, shipped, or stored with convenience or success. It is to overcome these difficulties that I have made investigations which have resulted in the invention which is the subject-matter of this application. It appears that the deliquescence of these various substances is in great part due to the presence of deliquescent albuminoids, which, by reason of their great affinity for atmospheric moisture, cause these substances to liquefy. I take the tank-water or other such product containing nitrogenous organic matter and evaporate and dry it at a comparatively low temperature, so as to expel the water. The substance is then dried, cooled, and pulverized. In this shape it is ready to be combined with some substance which will relieve it of its deliquescence, and the substance which I have found to be satisfactory for this purpose is unslaked lime, (CaO.) I find that according to the season and the climate in which the compound is prepared the relative quantity of unslaked lime required will vary accordingly. In this compound, so made of suitable quantities of these nitrogenous fertilizing materials and the unslaked lime, the fertilizer so formed is found to be practically dry and free from a tendency to deliquescence, so that it can be exposed to atmospheric air, and even to moisture, when found in more pronounced quantities, without fear of its becoming sticky or liquefied. In this condition it can be readily packed, shipped, or stored, and can also be easily distributed for use. It is a very rich fertilizer, and can be used in combination with other fertilizers to supply them with the necessary quantity of nitrogen, according to the use to which the fertilizer so formed is to be applied. The method by which I combine these two substances is as follows: I take the unslaked lime and break it into small lumps, and the fertilizing matter I break into small lumps from the dry cakes in which it appears when dried ready to be powdered. These two substances are then fed together in proper proportions into a grinding or pulverizing machine, which thoroughly pulverizes and mixes them, making such a close mechanical union of the various particles as to leave a powdery non-deliquescent substance.

The use and operation of the compound are as follows:

The unslaked lime is a powerful absorbent of water, and as soon as it is thoroughly and mechanically mixed with the powdered fertilizer, so that the particles of the two substances are in close contact, the particles of unslaked lime will immediately absorb the moisture remaining in the fertilizer, and when the compound is exposed to moisture—as, for instance, the moisture of the atmospheric air—the moisture which is received by the particles of unslaked lime will be immediately absorbed by them, and the moisture which is received by any of the particles of the fertilizing material will be immediately absorbed thence into the adjacent particles of lime. The action of the unslaked lime is important in another respect. The organic acids which are found in the organic matter are neutralized and retained in combination with the lime as an organic salt of lime. Lime, also being an antiseptic, consequently prevents putrefactive decomposition, and therefore preserves the goods as a fertilizer.

This fertilizer can be distributed in any desired manner, even in solution when necessary, as the unslaked lime (CaO) does not interfere with the solubility of the material in water. When used in solution properly diluted by any watering process, it percolates through the soil, leaving the powdered lime at the surface, which is in itself a rich fertilizer. It will be observed that this fertilizer is too rich for use alone, and it is therefore intended for enriching other fertilizers.

I am aware that in the manufacture of certain fertilizers from tank-water, where acid sulphates constitute a part of the manufacturing process, alkalies and alkaline earths have been used for the purpose of neutralizing the acidity of the material, and not for absorbing or drying purposes, as these substances (alkalies and alkaline earths) are introduced while the material is in the liquid state. When unslaked lime is used for this purpose, it unites with the acid sulphates present, forming calcium sulphate, upon which its neutralization depends. The remaining quantity of unslaked lime present, if any, is converted by the water into calcium hydrate, (CaHO,) (slaked lime,) and it exists at no time in liquid mixture as oxide, (CaO.) The chemical equation is as follows: calcium oxide, or unslaked lime, $(CaO) + $ water $(H_2O) = $ calcium hydrate, or slaked lime, $(CaHO_2.)$ The lime, being chemically saturated with water, possesses no further power for absorption.

I am aware that it has been attempted to make a somewhat similar product by a different process—that is to say, by mixing unslaked lime with the liquid animal matter, then evaporating and drying the same at a high temperature, and then pulverizing the product, the high temperature being required in order to reconvert the hydrate of lime into an oxide of lime, while at the same time in so raising the compound to a high degree much of the nitrogen is expelled.

I claim—

A process of manufacturing a dry fertilizer from nitrogenous animal matter, such as tankage or tank-water residue, which consists in drying such matter at a low temperature, then adding to it suitable quantities of unslaked lime, the dried matter and lime being broken up convenient for handling, then thoroughly mixing and pulverizing the compound until it is brought into the condition of a powder.

PAUL CHRISTEN JENSEN.

Witnesses:
A. J. ROBERTSON,
W. E. McHENRY.